United States Patent [19]

Shojima et al.

[11] Patent Number: 5,191,622
[45] Date of Patent: Mar. 2, 1993

[54] HAND-WRITTEN CHARACTER RECOGNITION APPARATUS WITH A PERSONAL DICTIONARY PREPARATION FUNCTION

[75] Inventors: Hiroshi Shojima, Hitachi; Soshiro Kuzunuki, Katsuta; Yasushi Fukunaga, Hitachi; Toshihiko Matsuda, Owariasahi; Toshio Takekoshi, Isehara; Masaki Miura, Hitachi; Junko Mori, Hitachi; Toshimi Mifune, Hitachi, all of Japan

[73] Assignee: Hitachi, Ltd., Tokyo, Japan

[21] Appl. No.: 219,265

[22] Filed: Jul. 15, 1988

[30] Foreign Application Priority Data

Jul. 17, 1987 [JP] Japan ................................. 62-176981
Jul. 17, 1987 [JP] Japan ................................. 62-176982
Aug. 12, 1987 [JP] Japan ................................. 62-199815
Mar. 18, 1988 [JP] Japan ................................. 63-63337

[51] Int. Cl.⁵ .............................................. G06K 9/62
[52] U.S. Cl. ...................................... 382/13; 382/30; 341/90; 364/419
[58] Field of Search ................... 382/13, 2, 3, 16, 52, 382/30, 69; 364/419; 341/90

[56] References Cited

U.S. PATENT DOCUMENTS

| | | | |
|---|---|---|---|
| 4,607,386 | 8/1986 | Morita et al. | 382/13 |
| 4,672,677 | 6/1987 | Yamakawa | 382/13 |
| 4,672,678 | 6/1987 | Koezuka et al. | 382/30 |
| 4,680,804 | 7/1987 | Kuzunuki et al. | 382/13 |
| 4,685,142 | 8/1987 | Ooi et al. | 382/13 |
| 4,736,447 | 4/1988 | Korsinsky | 382/69 |
| 4,752,965 | 6/1988 | Dunkley et al. | 382/13 |
| 4,758,979 | 7/1988 | Chiao-Yueh | 382/13 |
| 4,829,472 | 5/1989 | McCourt | 364/419 |
| 4,944,022 | 7/1990 | Yasujima et al. | 382/13 |

Primary Examiner—Michael T. Razavi
Assistant Examiner—Yon Jung
Attorney, Agent, or Firm—Antonelli, Terry, Stout & Kraus

[57] ABSTRACT

A hand-written character recognition apparatus with a personal dictionary preparation function has a character recognition unit for comparing an input hand-written character data with a registered standard dictionary to recognize a most similar character pattern, and a display unit for selecting and displaying a display font corresponding to the recognized character pattern, so that a personal peculiar character or simplified character inputted can be recognized. When a personal dictionary is to be registered, the character to be registered is inputted by hand-writing, the character recognition unit compares the input hand-written character data with the standard dictionary to recognize a similar character pattern, and the recognized character code of the standard dictionary is selected as the character code to be registered. When the personal dictionary is to be prepared, a personal pattern input frame which permits simultaneous input of a plurality of personal hand-written character patterns is provided, and the input personal patterns are allotted to one character code to be registered. When the personal character pattern is to be prepared and registered, similarity between the input personal pattern and the registered dictionary pattern is checked, a stability index indicating a degree of stability of recognition of the personal pattern is calculated based on the similarity, and the stability index is displayed.

6 Claims, 20 Drawing Sheets

FIG. 27a

| RECOGNITION | CODE INPUT | | PATTERN |
|---|---|---|---|
| | CHARACTER | CONVERT | |
| | FONT | | REGISTER |
| | PEN | ERASER | |

| INPUT PERSONAL PATTERN | | | | | |
|---|---|---|---|---|---|
| 祭 | 80 | | | | |
| 登 | とう | | | | |

FIG. 27b

| RECOGNITION | CODE INPUT | | PATTERN |
|---|---|---|---|
| | CHARACTER | CONVERT | |
| | FONT | | REGISTER |
| | PEN | ERASER | |

| PERSONAL PATTERN HAS BEEN REGISTERED | | | | | |
|---|---|---|---|---|---|
| 祭 | 80 | 100 | | | |
| 登 | とう | | | | |

HAND-WRITTEN CHARACTER RECOGNITION APPARATUS WITH A PERSONAL DICTIONARY PREPARATION FUNCTION

BACKGROUND OF THE INVENTION

The present invention relates to a hand-written character recognition apparatus, and more particularly to a hand-written character recognition apparatus having a personal dictionary preparation function.

In a hand-written character recognition apparatus, in order to process personalized characters or "peculiar characters", a personal dictionary is provided to improve the recognition factor.

JP-A-55-135973 discloses a hand-written character recognition apparatus having a function to on-line provide a personal dictionary by directly inputting character codes.

In this system, however, a user must examine a code table for character codes of characters to be registered, and enter them through a keyboard or key menu. Accordingly, interactivity is poor.

JP-A-55-135973 discloses a method of inputting a personal pattern after designation of a registration mode and then inputting a code to be registered to complete the registration. Thus, the entry of the personal pattern and the entry of the code to be registered are paired. JP-A-58-23887 discloses a method for comparing font dictionaries of a plurality of persons which have been previously prepared with a personal font which is being prepared, selecting a similar font as an initial personal dictionary, updating the initial personal dictionary as it is used, and finally preparing a personal dictionary.

However, the prior art methods do not pay attention to the preparation of a personal dictionary for stroke sequence, number of strokes and simplified characters. As a result, it is not simple to prepare the personal dictionary.

In the former prior art method, the entry of the personal pattern and the entry of the code are paired. Therefore, if a plurality of personal patterns are to be registered for one code, the entry of code must be carried out a number of times.

On the other hand, in the latter prior art method, no attention is paid to the processing of stroke sequence, number of strokes and simplified characters because the initially set dictionary is updated.

JP-A-59-106085 discloses a method of entering a character by hand-writing, and if a recognition result is in error, registering an additional dictionary pattern, managing numbers of times of normal reading and error reading, and deleting or adding a dictionary pattern when the number of times of normal reading and error reading exceed predetermined values to update the personal dictionary.

This method, however, does not pay attention to error recognition when the personal dictionary is additionally registered. Since an operator does not feed back the similarity of the existing dictionary pattern when the personal dictionary is additionally registered, similar personal dictionary patterns are prepared from time to time.

SUMMARY OF THE INVENTION

It is an object of the present invention to provide a character recognition apparatus which allows easy preparation of a personal dictionary by providing means to allow a user to readily obtain a character code of a character to be registered without examining a code table.

It is another object of the present invention to provide a character recognition apparatus with a personal dictionary preparation function which allows easy registration of a personal pattern dictionary having hand-written character variations such as in the stroke sequence, the number of strokes and simplified characters.

It is another object of the present invention to provide a character recognition apparatus with a personal dictionary preparation function which can recognize a personal peculiar character or simplified character at a high recognition rate.

In a character recognition apparatus having a personal dictionary preparation function in accordance with the present invention, a standard dictionary in the hand-written character recognition apparatus and a pre-registered personal dictionary are used, and a character to be registered is entered by hand-writing, and a character code which is a recognition result (character recognition result is a character code having one-to-one correspondence to the input character) is used as the character code to be registered. Reading of the character is entered by a character menu or character recognition, and a result of KANA/KANJI conversion of the reading or a character code selected from a character sequence list displayed around the character corresponding to the reading is selected as the character code to be registered.

In a character recognition apparatus having a personal dictionary preparation function according to the present invention, an input frame which allows entry of a plurality of personal hand-written patterns for one character code to be registered is provided, personal patterns of various fonts are inputted to the input frame, and a personal dictionary is prepared when the completion of registration is designated. Since a plurality of personal patterns for one character code to be registered may be simultaneously inputted, personal dictionaries of various fonts can be readily prepared.

In a character recognition apparatus having a personal dictionary preparation function according to the present invention, when a personal character pattern is to be registered, a similarity between the registered dictionary pattern and an input personal pattern is examined, a stability index which indicates how stably the input personal pattern may be recognized, based on the similarity, on the stability index is displayed. Thus, an operator can determine whether the input personal pattern should be registered or not, and misrecognition is reduced.

In accordance with the present invention, when a character code is to be designated in registering a personal dictionary, the operator need not look up the character code table each time and the operability is improved.

In accordance with the present invention, since a plurality of personal patterns can be simultaneously inputted for one character code to be registered, the personal dictionaries of various fonts such as variations of the stroke sequence, variations of the numbers of strokes, simplified characters and peculiar characters can be simply prepared in one run.

In accordance with the present invention, when a personal character pattern is to be registered, a possibility of correct recognition is displayed. Accordingly, a peculiar character or simplified character can be readily registered, and a personal character pattern can be recognized at a high recognition rate.

BRIEF DESCRIPTION OF THE DRAWINGS

FIGS. 25(a), 25(b), 26(a), 26(b), 27(a), 27(b) 28(a), 28(b), 29(a) and 29(b) illustrate screen displays and operations of the embodiments of the present invention.

DESCRIPTION OF THE PREFERRED EMBODIMENTS

Figure 1:
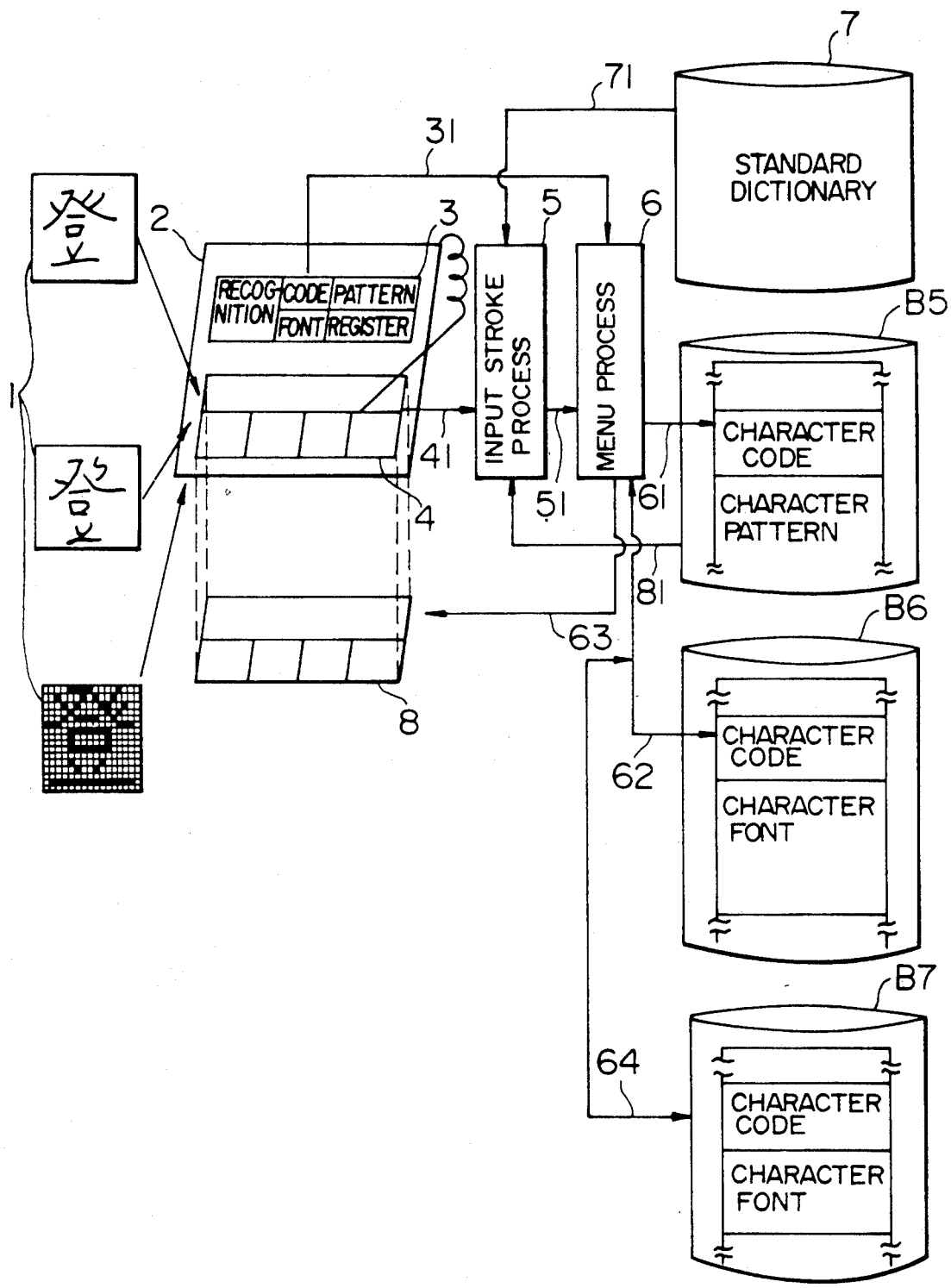
FIG. 1 shows a block diagram of a hand-written character recognition apparatus with a personal dictionary preparation function in accordance with the present invention.

FIG. 1 shows a character recognition apparatus having a personal dictionary preparation function in accordance with the present invention. It comprises integral input/display units 2, 8, an input stroke processing unit 5 including character recognition means, a menu processing unit 6, a standard dictionary 7 for recognition, a personal dictionary B5, a display personal font buffer B6 and a standard font buffer B7. The integral input/display units 2, 8 have a transparent tablet 2 overlaid on a display unit 8 to form electronic paper and pen. The personal dictionary B5 and the display personal font B6 may be registered on a RAM card which is pluggable into the character recognition apparatus comprising the integral input/display units 2, 8, menu processing unit 6, recognition standard dictionary 7 and standard font B7.

Figure 2:
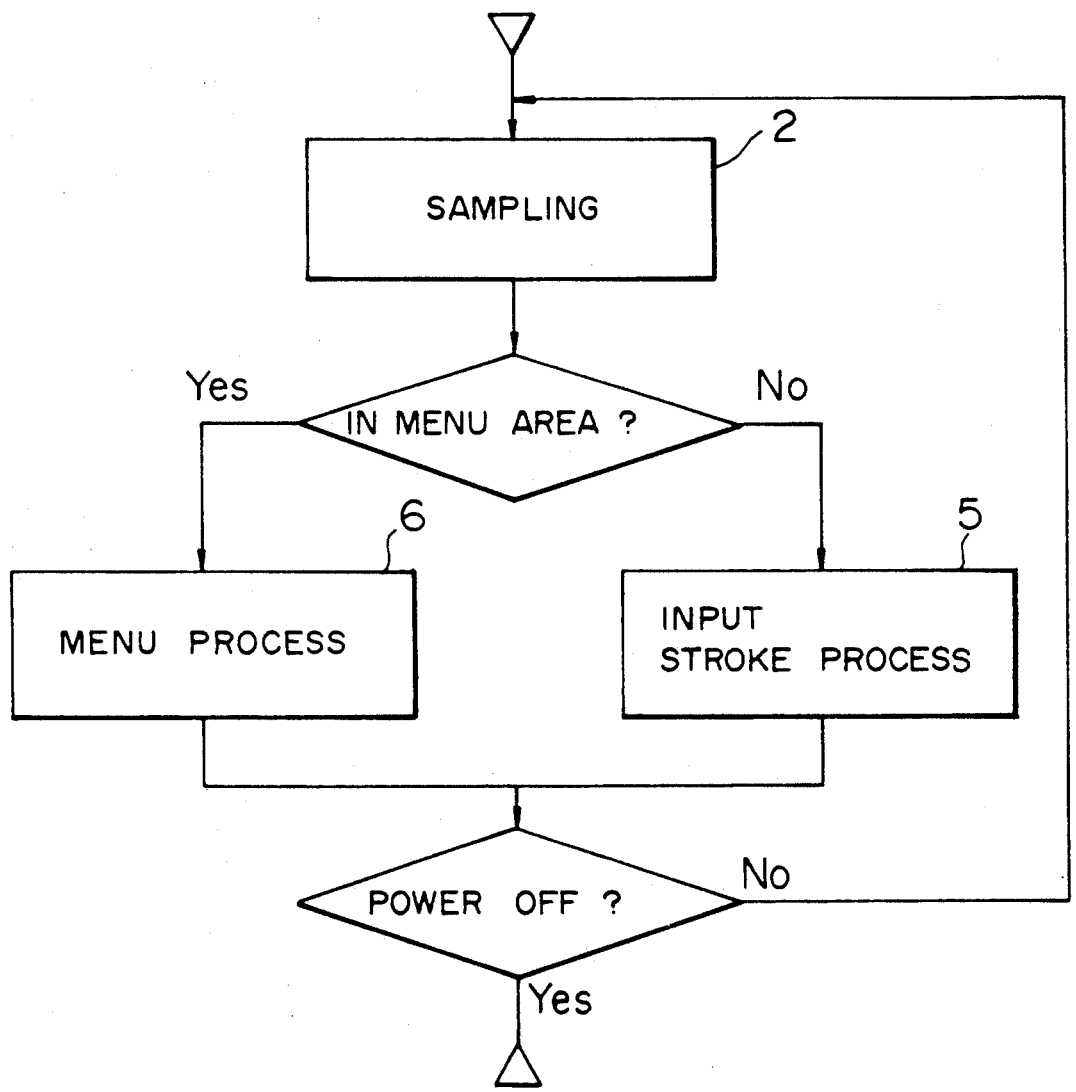
FIG. 2 shows a main flow chart of a basic operation of the hand-written character recognition apparatus.

A basic operation of the present apparatus is illustrated in FIG. 2. When a menu 3 on the tablet 2 is selected by a pen, the menu processing unit 6 is activated to determine the data processing mode and transfer direction. When a character is entered by hand-writing in a character input area 4 on the tablet 2, the input stroke processing unit 5 is activated. For example, when a menu item "recogntion" is selected, the menu processing unit 6 sets a recognition mode and a transfer direction to the display unit 8. The input stroke processing unit 5 recognizes the next hand written input character, and a result of recognition is transferred to the display unit 8 for display.

The personal dictionary preparation function of the present invention is now explained in accordance with a personal dictionary preparation procedure.

① Enter a character code to be personally registered

Figure 3:
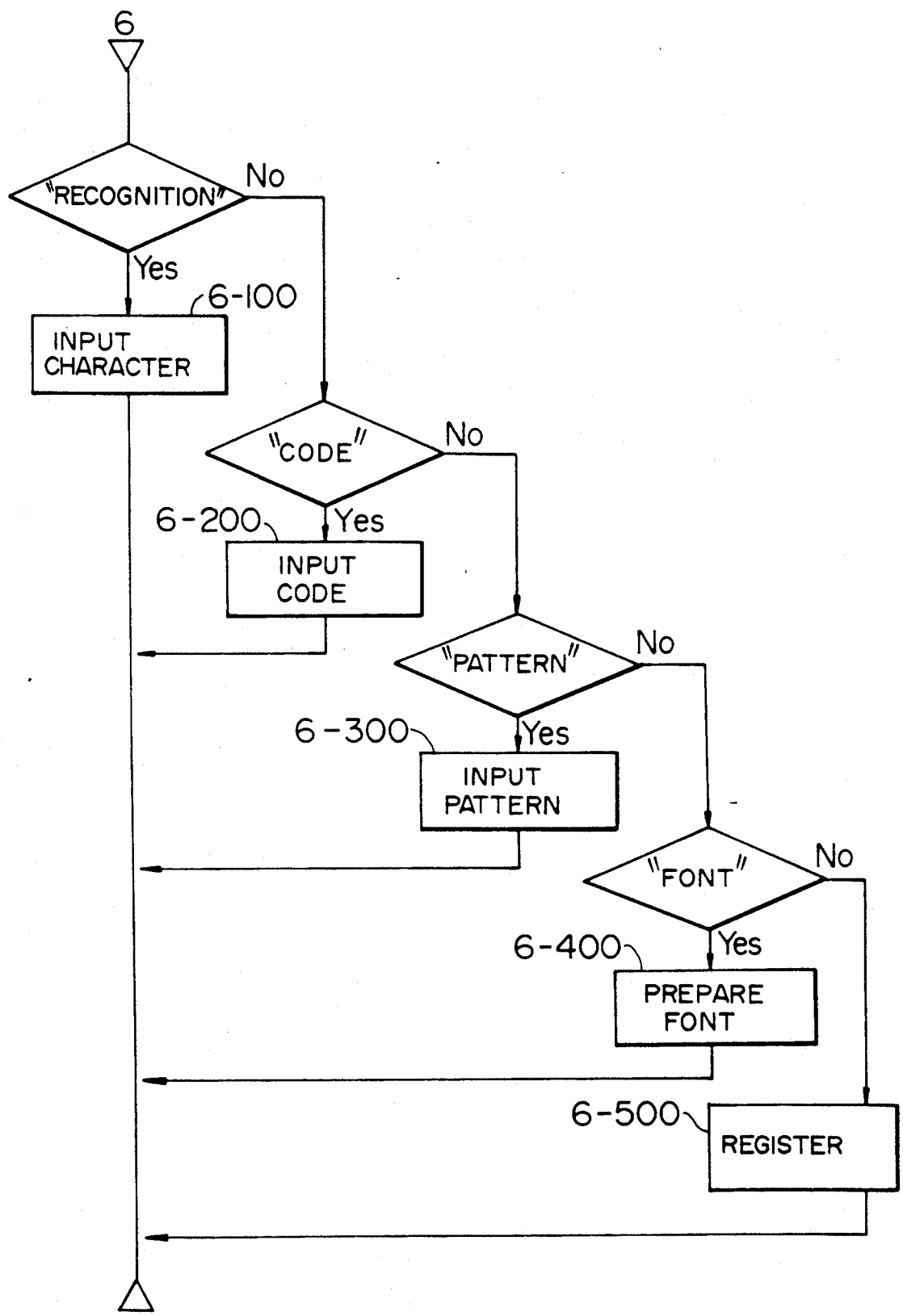
FIGS. 3 to 8 and 15 show flow charts of a menu processing unit.
Figure 4:
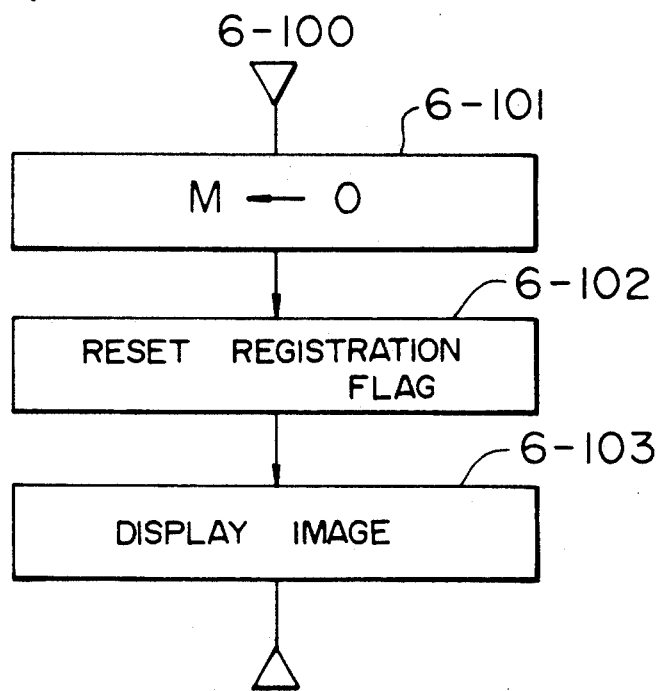
Figure 25A:
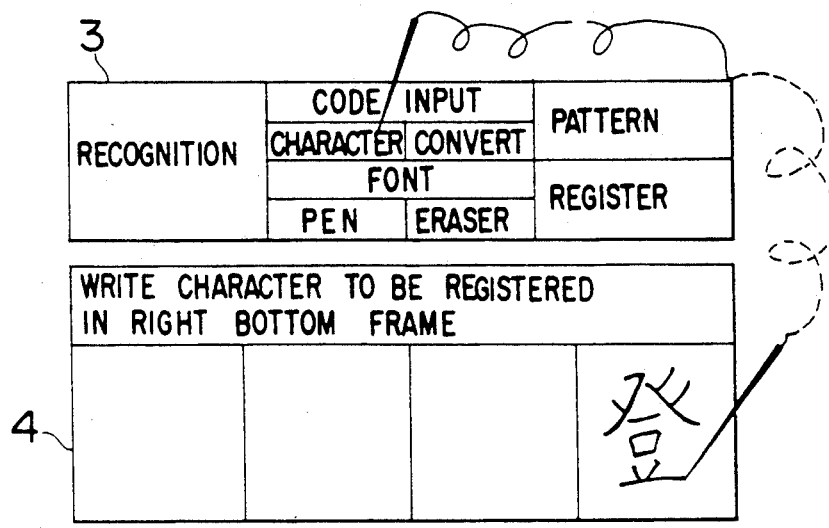

When "character" in a menu area 3 of FIG. 25a is selected, the information thereof is transferred to the menu processing unit 6 through a signal line 31 shown in FIG. 1. The menu processing unit 6 sets a code input mode as shown in FIG. 3 (step 6-200).

Figure 5:
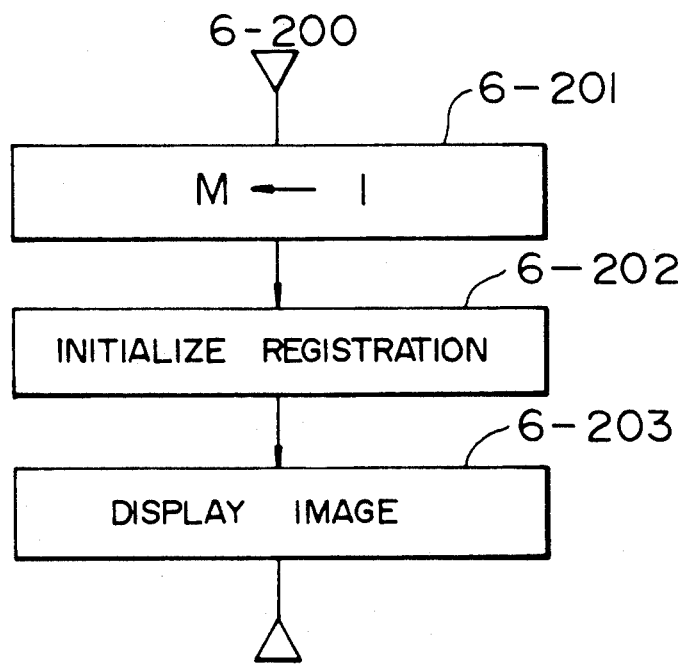
Figure 9:
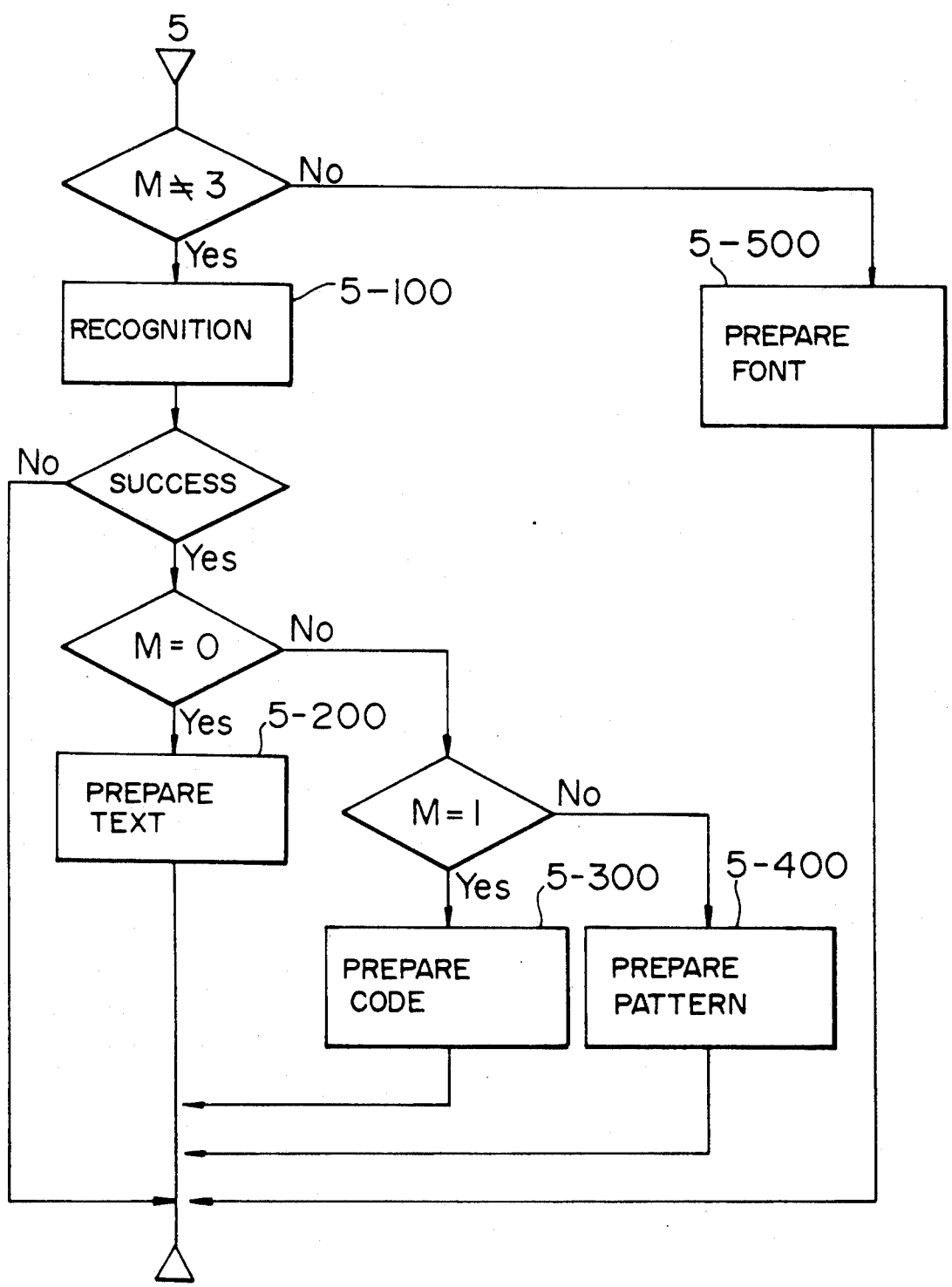
FIGS. 9 to 14, 23 and 24 show flow charts of an input stroke processing unit.
Figure 15:
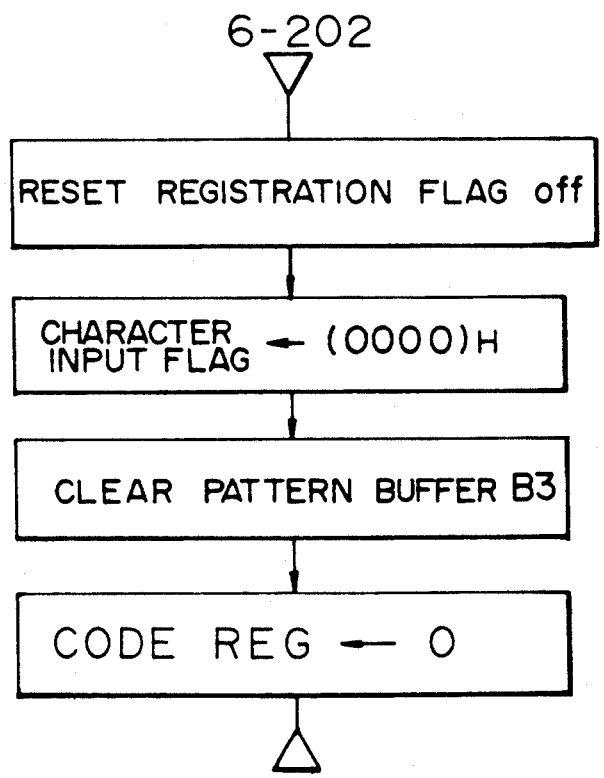
Figure 18:
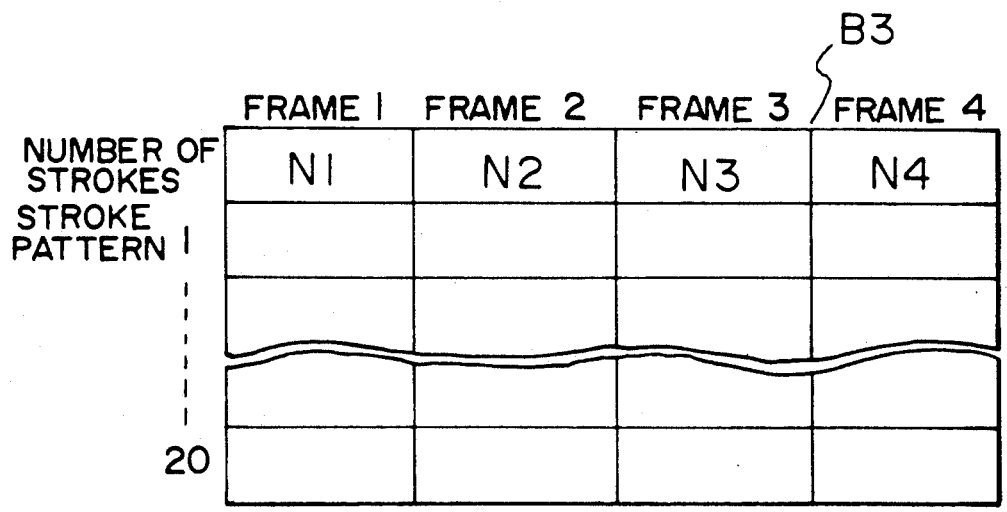

In the code input setting step 6-200, a mode register M is set to "1" as shown in FIG. 5 (step 6-201), registers, flags and buffers used to prepare the personal dictionary are initialized (step 6-202), and a message is transferred to the integral input/display unit (step 6-203). As shown in FIG. 15, the initialization step 6-202 resets a registration flag P FLAG which indicates whether the personal dictionary is being prepared or not, resets character input flags C FLAG 1 to C FLAG 4 which indicate presence or absence of a character input into each frame of the character input area shown in FIG. 25a, erases the content of the pattern buffer B3 (FIG. 18) which stores pattern data of the input character in each frame, and resets a code register CODE REG which stores the character code to be registered to "0". As shown in FIG. 25a, the operator writes a character "字" to be registered, in a right bottom frame. The tablet 2 shown in FIG. 1 transfers the hand-written character data to the input stroke processing unit 5 through a signal line 41. The input stroke processing unit 5 carries out the character recognition in a step 5-100 as shown in FIG. 9. In the character recognition step 5-100, truncation of a character is carried out if the input hand-written character data is longer than a predetermined length TH and the content of the mode register M is not "2".

In the character truncation step, the completion of entry of one character is determined by frame movement of a pen as disclosed in JP-A-52-15187 or elapse of a predetermined time after the entry of the last hand-written character data. If the sequentially entered hand-written character data is in the same frame, an entry incompletion flag NF is set in a step 5-105 so that recognition is not carried out. On the other hand, if the pen has moved to another frame or a predetermined time has elapsed since the last entry of the hand-written data, a recognition step 5-101 is carried out.

Figure 16:
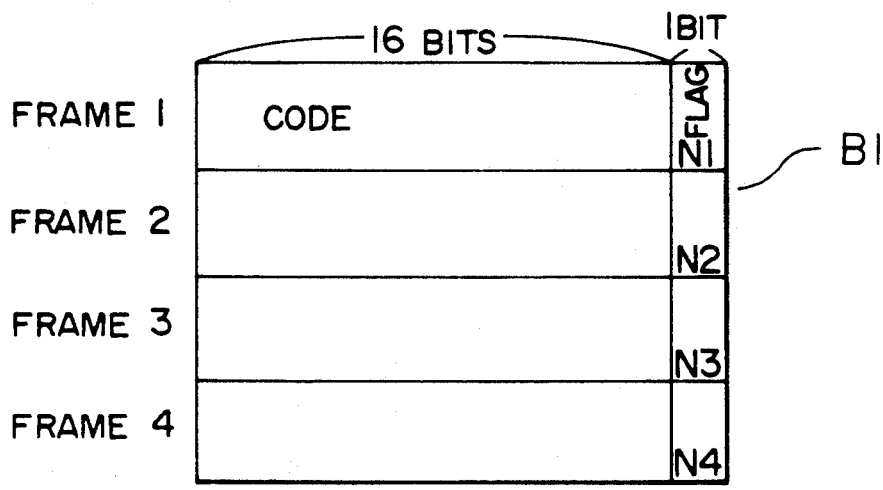
FIGS. 16 to 22 show various buffers used in the embodiments of the present invention.

The recognition step 5-101 is carried out by a pattern matching method as disclosed in JP-A-59-128680, and a resulting character code is stored in a code area of a frame 4 of a code buffer B1 (FIG. 16) in a step 5-102 and a flag N4 is set to indicate the completion of entry. The content of the frame 4 is then transferred to a code preparation step 5-300 shown in FIG. 9 in accordance with the content "1" of the mode register M set by the menu processing unit 6. In the step 5-300, the content of the frame 4 is stored in a code register CODE REG in accordance with the character input. The frame includes four frames in the character input area 4.

Figure 25B:
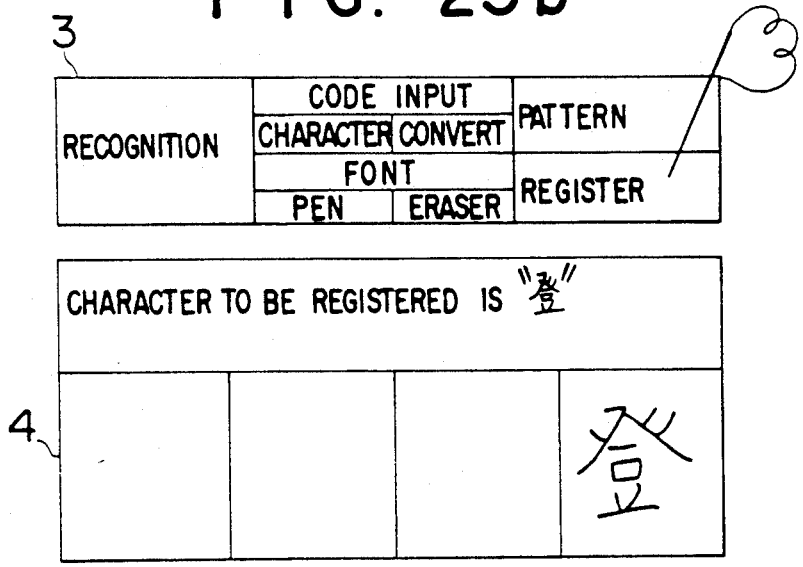

As shown in FIG. 25b, to character code stored in CODE REG is displayed on the display unit 8 by a font and a code. The operator watches the display, and if it is a desired character, he/she selects the menu "register" shown in FIG. 25b. Then, the menu processing unit 6 carries out a registration step 6-500.

Figure 8:
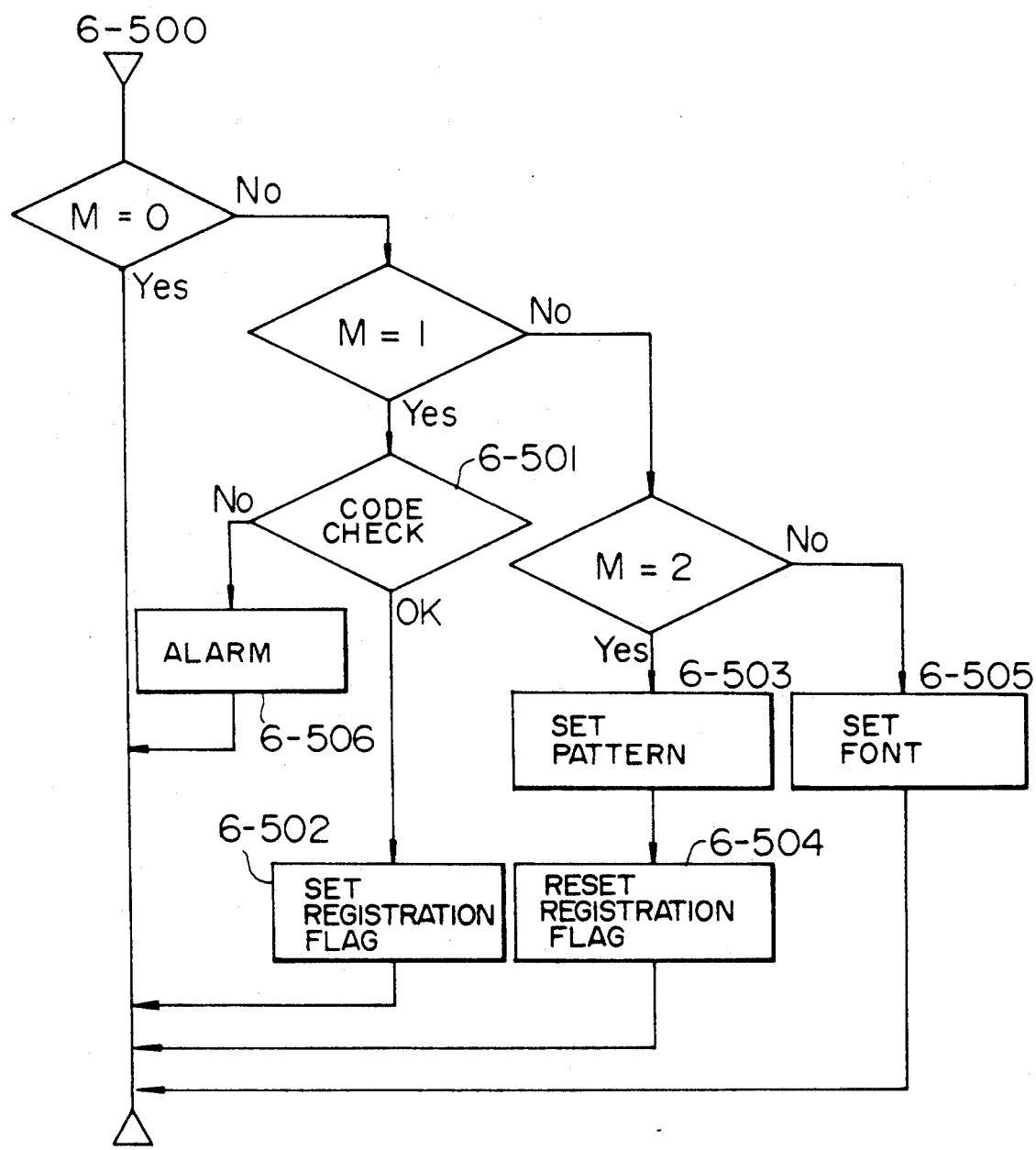

In the step 6-500, if the code stored in the code register CODE REG is not within a predetermined code range, a warning step 6-506 of FIG. 8 is carried out to request reentry to the operator. On the other hand, if it is within the predetermined range, the registration flag P FLAG is set. At this moment, the code entry is completed.

There are two other methods for designating the character code to be registered.

1. The operator enters the reading of the character to be registered by hand writing or keying or menu-selection, it is KANA to KANJI converted to display candidate characters, and a desired one of them is selected.

2. Where display character information of the apparatus is stored in the sequence of reading of characters, the user enters the reading of the character to be registered by hand writing, keying or menu selection, the characters corresponding to the reading are displayed, and a desired one of them is selected.

Figure 29A:
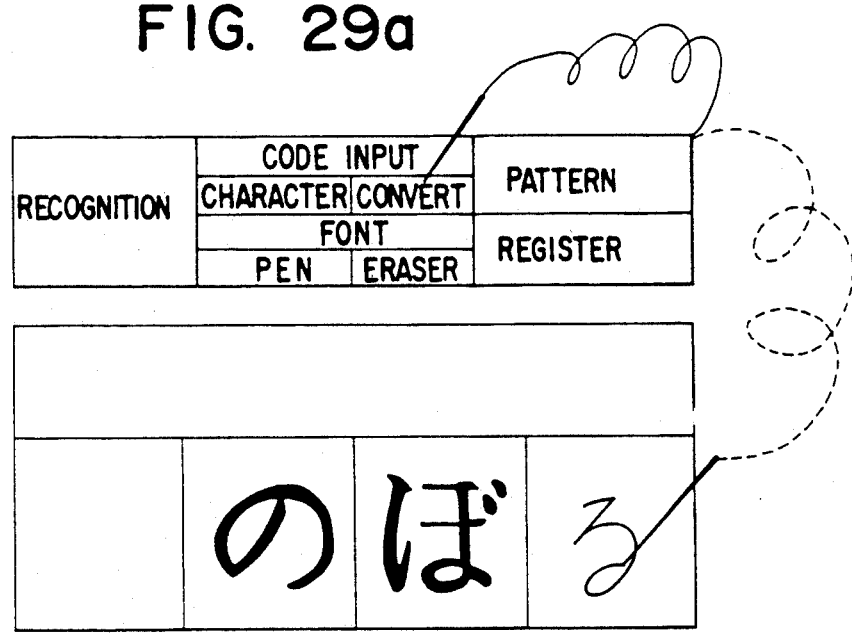
Figure 29B:
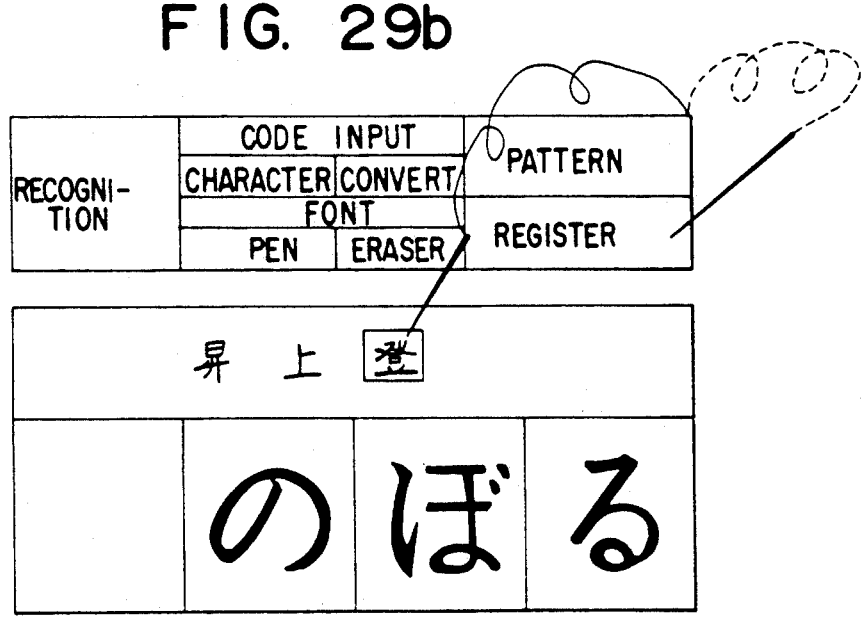

It is apparent that the character code corresponding to the desired character can be designated by the method 1 or 2. In the method 1, for example, a "convert" mode is selected when the character code is to be registered as shown in FIG. 29a, and the reading of the character to be registered is hand-written. The system sequentially recognizes the input reading patterns and KANJI characters corresponding to the recognition results are displayed. The operator selects one character from the displayed characters (FIG. 29b) and selects the menu "register" to complete the entry of the character code.

Figure 12:
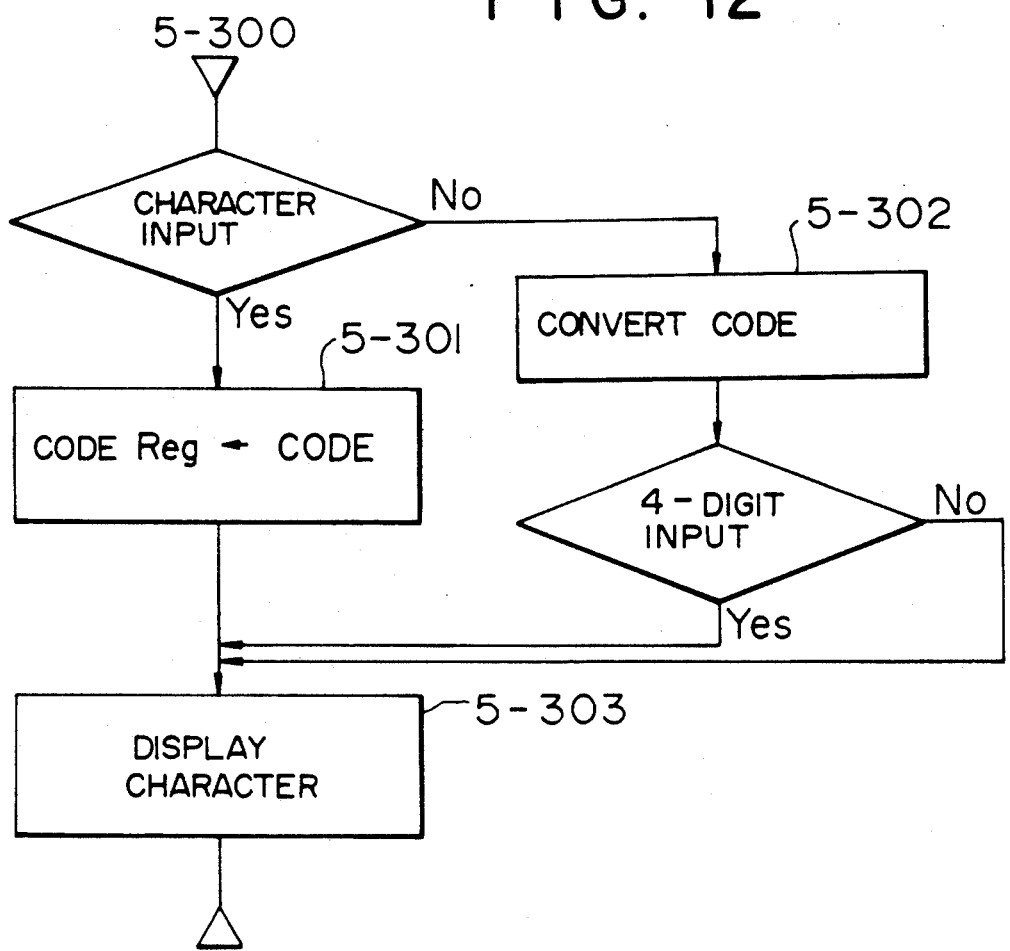
Figure 24:
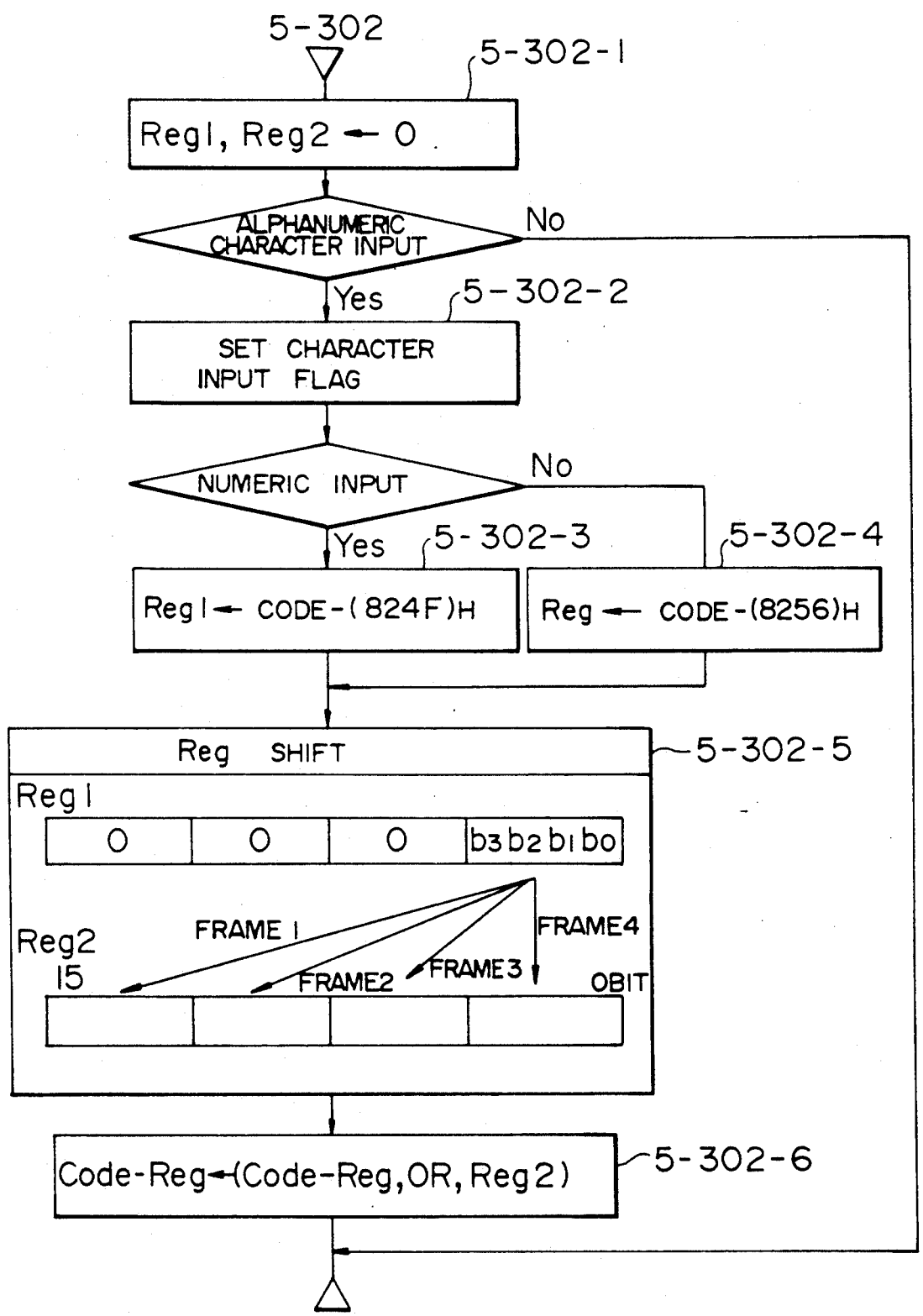
Figure 26A:
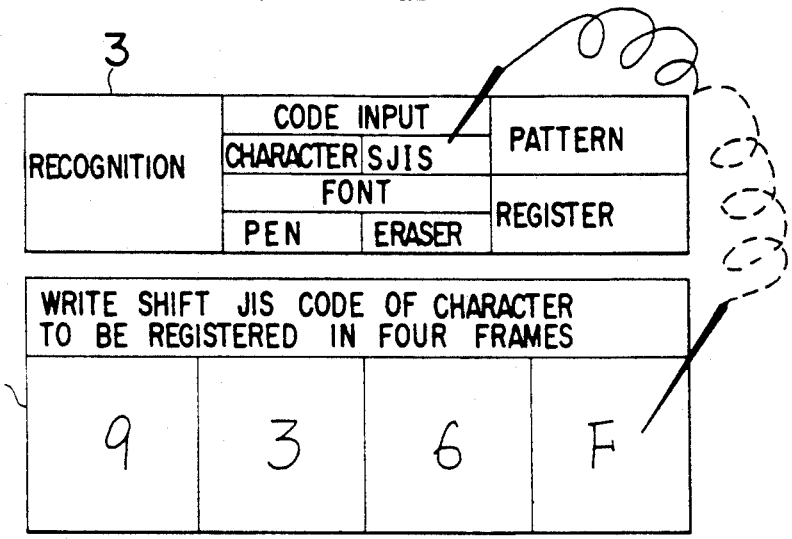
Figure 26B:
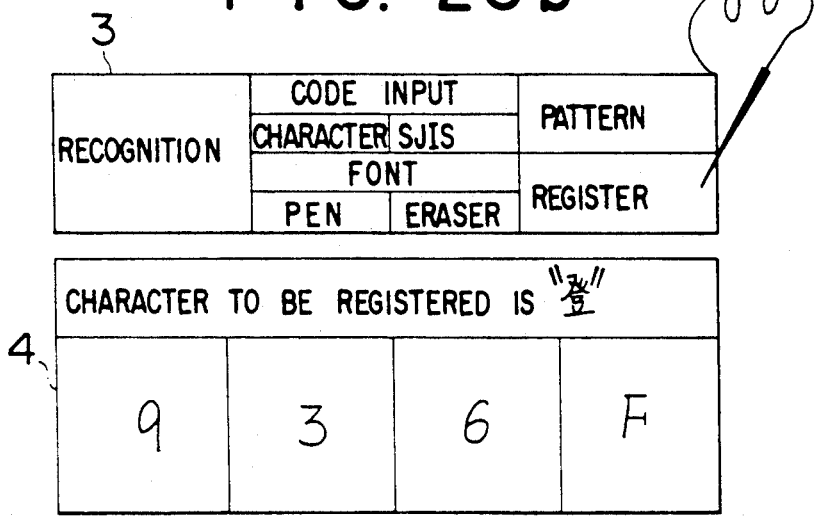

In an alternative method of entering the character code of the character to be registered, the character code instead of the character to be registered may be entered by hand writing. In this case, SJIS is selected in FIG. 26a and a shift JIS code is entered by hand writing in four bottom input areas. Then, in FIG. 12, the code conversion step 5-302 is carried out for the hand-written entry to each frame. When the entry to four frames is completed a character code is stored in a code register CODE REG. The above-mentioned code conversion step 5-302 is for carrying out the processing steps shown in FIG. 24. Namely, when there exists a character input in the N-th frame, and if a character as a result of recognition is 0, ... 9, A, ... or F, it is stored in character input buffer C BF and a character input flag C FLAGN for frame N is set (step 5-302-2). Subsequently, if the character code is either within a range for numerals (0 ... 9) or within a range for alphabets (A ... F), they are converted into hexadecimal numbers (step 5-302-3, step 5-302-4). The resulting hexadecimal numbers are shifted depending upon the frame positions (step 5-302-5), OR'ed with the content of the code register CODE REG and are stored in the code register CODE REG (5-302-6). Whether four digits have been inputted can be judged from the fact that all of the respective character input flags C FLAG 1 ... 4 are set. Subsequent processing steps are similar to those for step 6-500.

② Prepare a personal font

Figure 7:
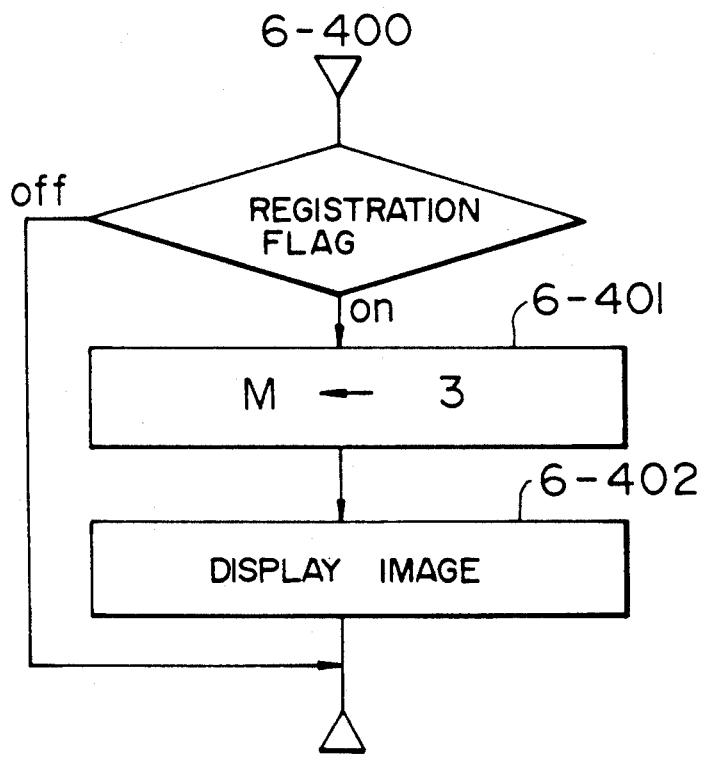
Figure 19:
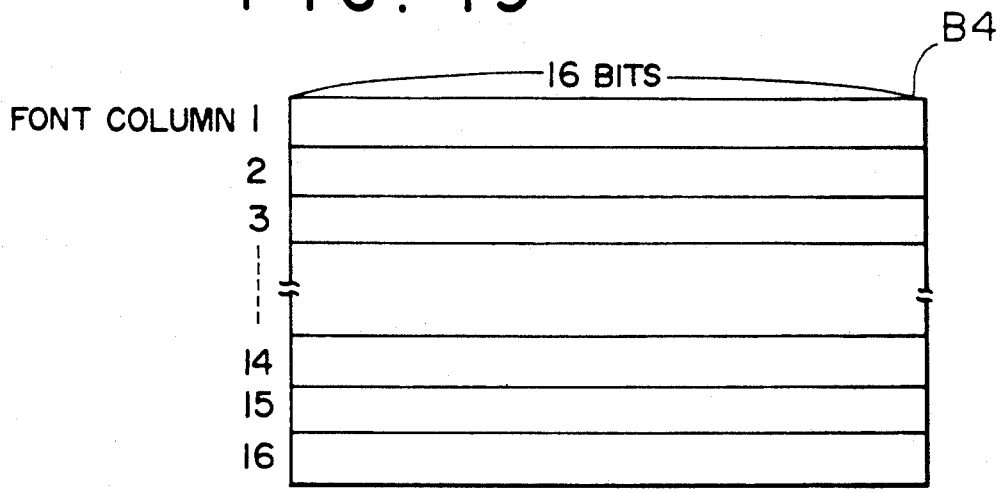
Figure 20:
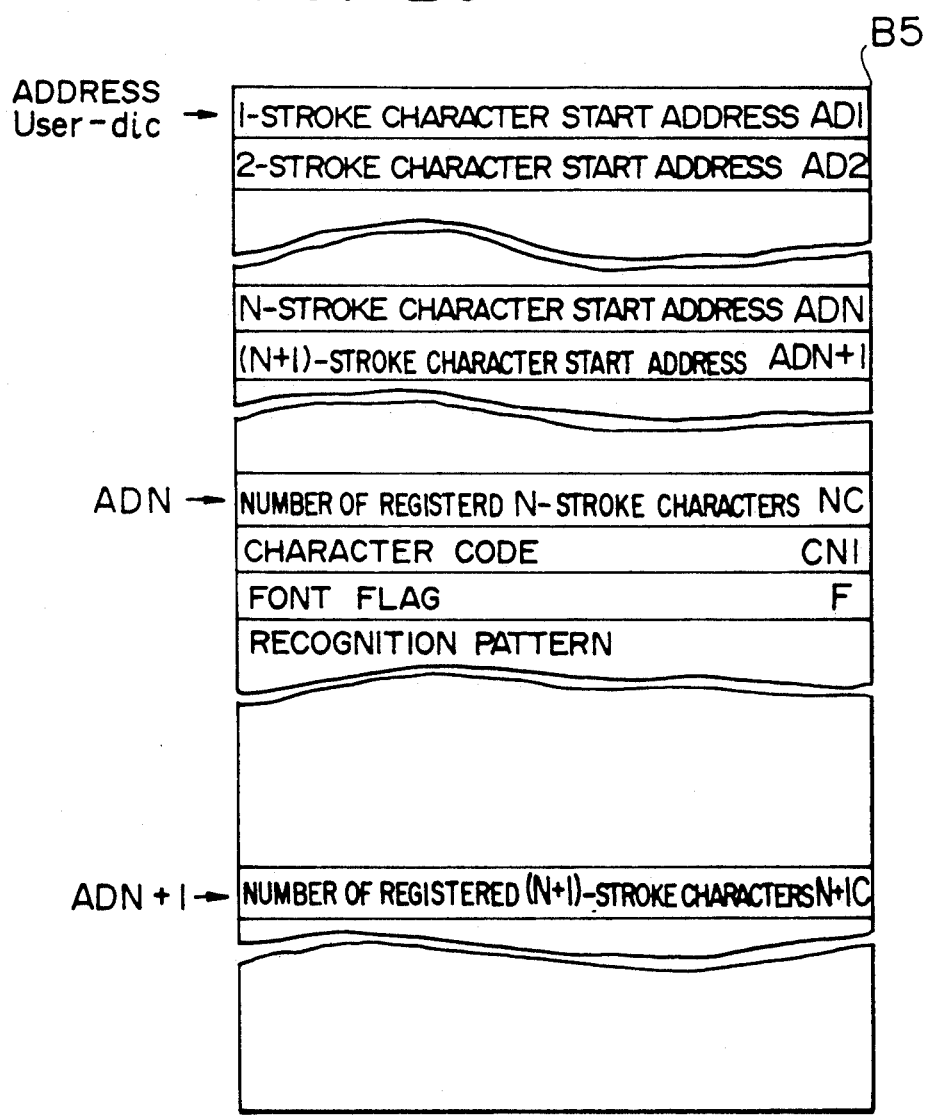
Figure 21:
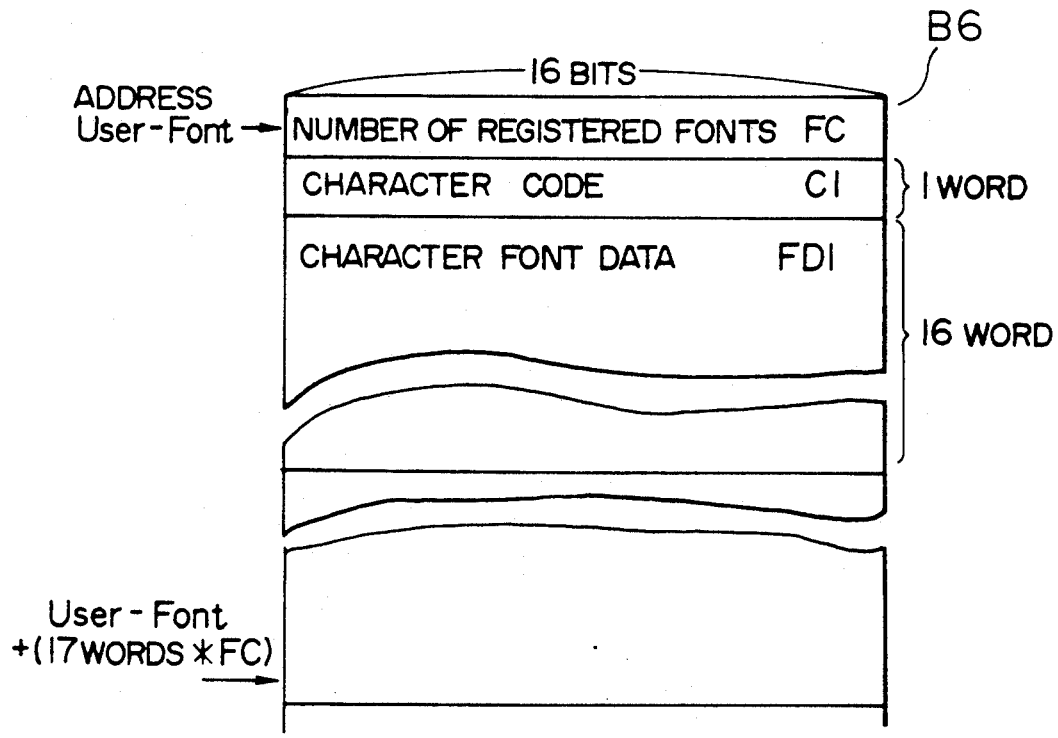
Figure 22:
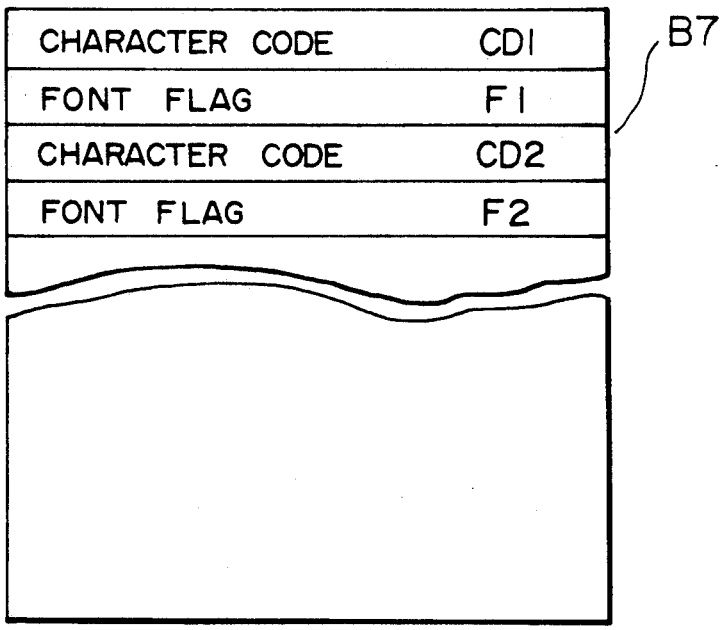
Figure 28A:
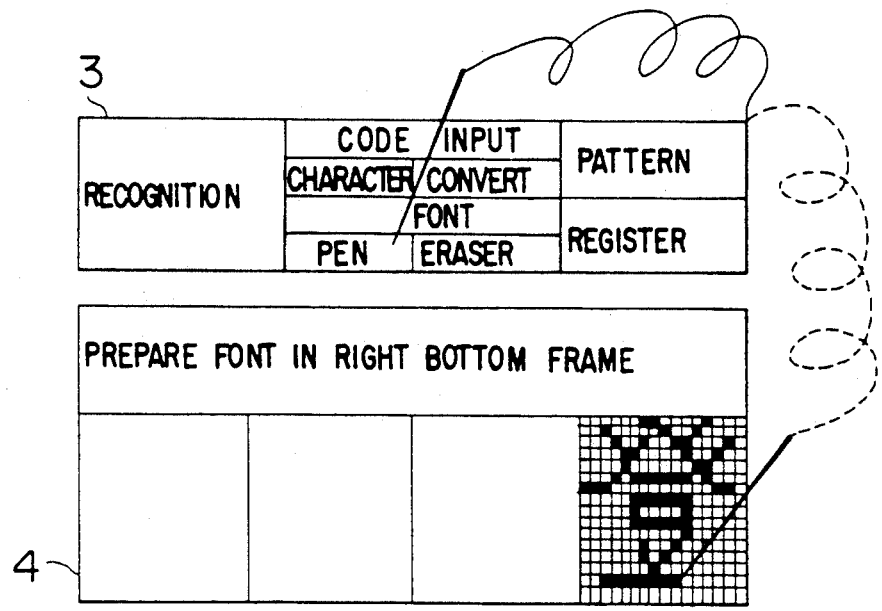
Figure 28B:
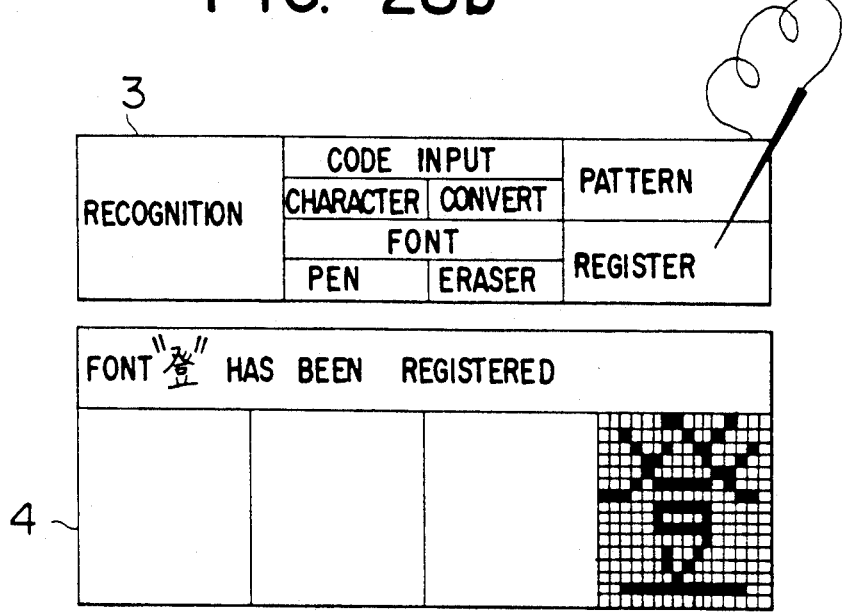

When a user wants to change a display font, a font corresponding to the character code set as described in ① above may be registered, so that it can be linked to a recognition pattern which is set in the next step ③. In FIG. 28a, when a font in the menu area 3 is selected, the menu processing unit 6 sets the font preparation mode of FIG. 3 (step 6-400). In the step 6-400, if the registration flag P-FLAG is "1" as shown in FIG. 7, the mode register M is set to "3" and display is made as shown in FIG. 28a When the operator then selects "pen" or "eraser" of the menu area 3 of FIG. 28a, font is prepared as shown in FIG. 28a. The input stroke processing unit 5 carries out the font preparation step 5-500 of FIG. 9. In the step 5-500, "1" for black writing or "0" for white writing is written into a bit corresponding to the input of the font buffer B4 shown in FIG. 19. When "register" is selected after the font has been prepared, the menu processing unit 6 carries out a font setting step 6-505 of FIG. 8. In the step 6-505, the font flag F of FIG. 20 is set, the content of the code register CODE REG and the content of the font buffer shown in FIG. 19 are added to a personal font buffer B6 of FIG. 21, and the number of registered fonts FC is incremented by one. In this manner, the registration of the personal font is completed.

③ Entry of personal pattern

Figure 6:
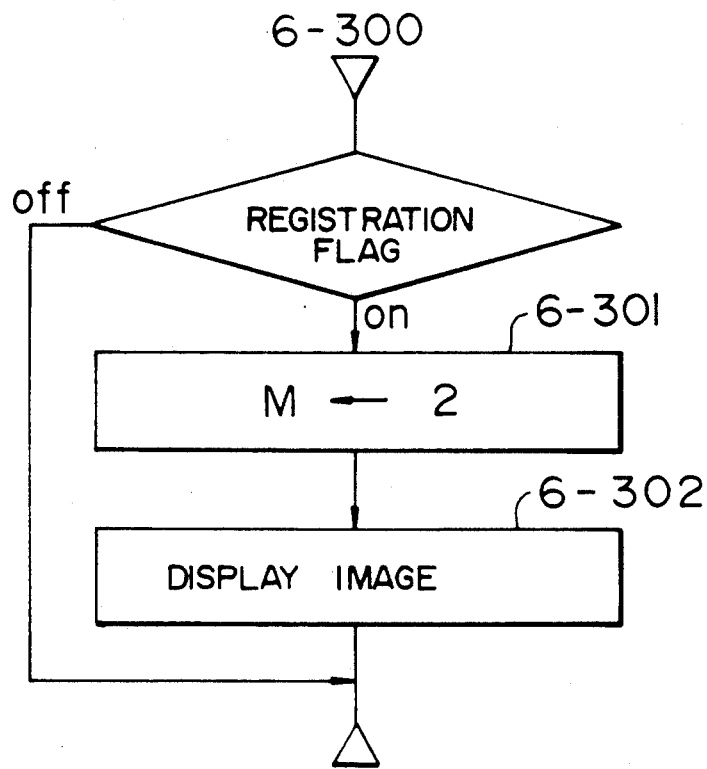

A method for registering a pattern for use in recognition is now explained. As shown in FIG. 27, the operator selects "pattern" in the menu area 3. Then, the menu processing unit 6 sets a pattern input mode of FIG. 3 (step 6-300). In the step 6-300, as shown in FIG. 6, if the registration flag P FLAG is "1", that is, if the code entry has been completed, the mode register M is set to "2" so that the image shown in FIG. 27 is displayed.

The operator enters the personal character pattern to be registered, in the four frames of the bottom character input area 4 (up to four patterns). In FIG. 27a, two character patterns are entered. In the present embodiment, up to four patterns may be entered, although the number of input frames may be changed.

Figure 13:
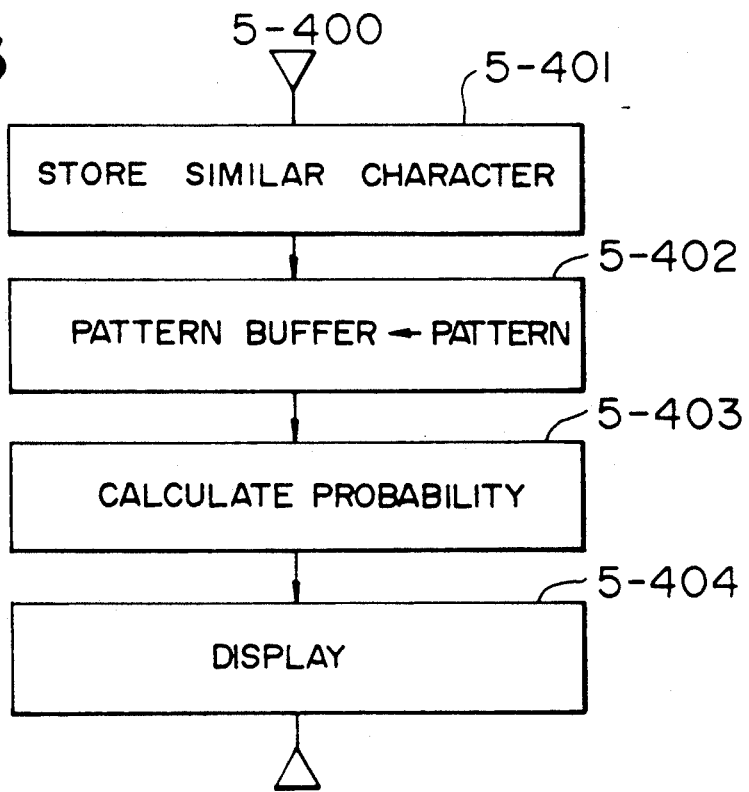
Figure 14:
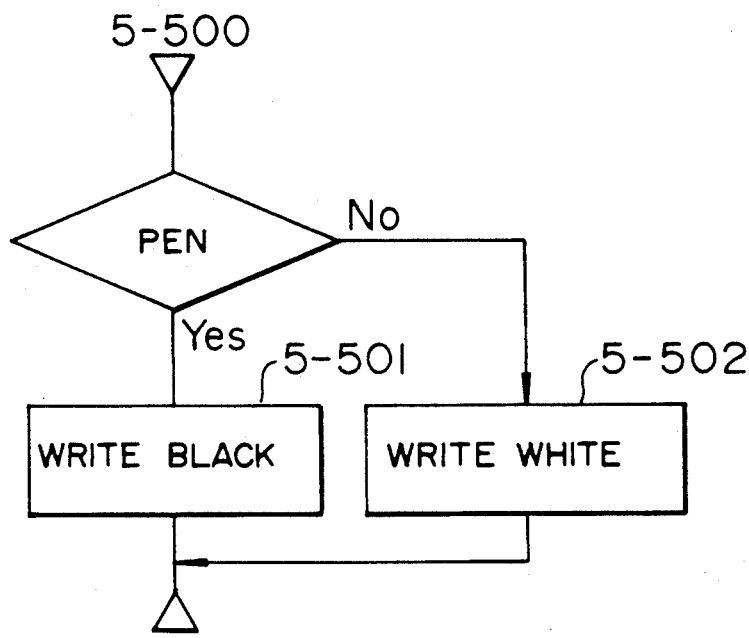
Figure 17:
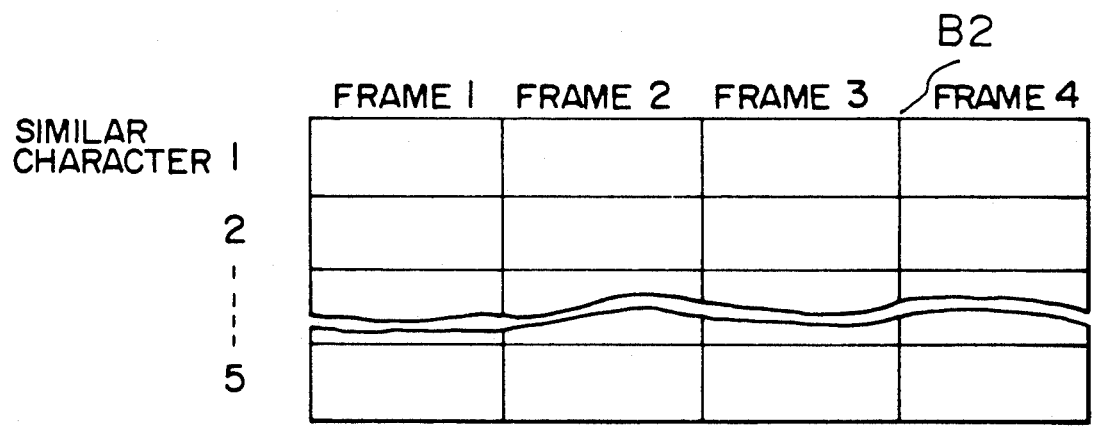

When the character pattern is entered, the input stroke processing unit 5 carries out the recognition step 5-100 for each input frame and then the pattern preparation step 5-400. In the step 5-400, as shown in FIG. 13, a character code sequence of the recognition result is stored in a similar character buffer B2 (FIG. 17). Then, the recognition data corresponding to the input character pattern is stored in the pattern buffer B3 (FIG. 18) together with the number of input strokes N.

Figure 23:
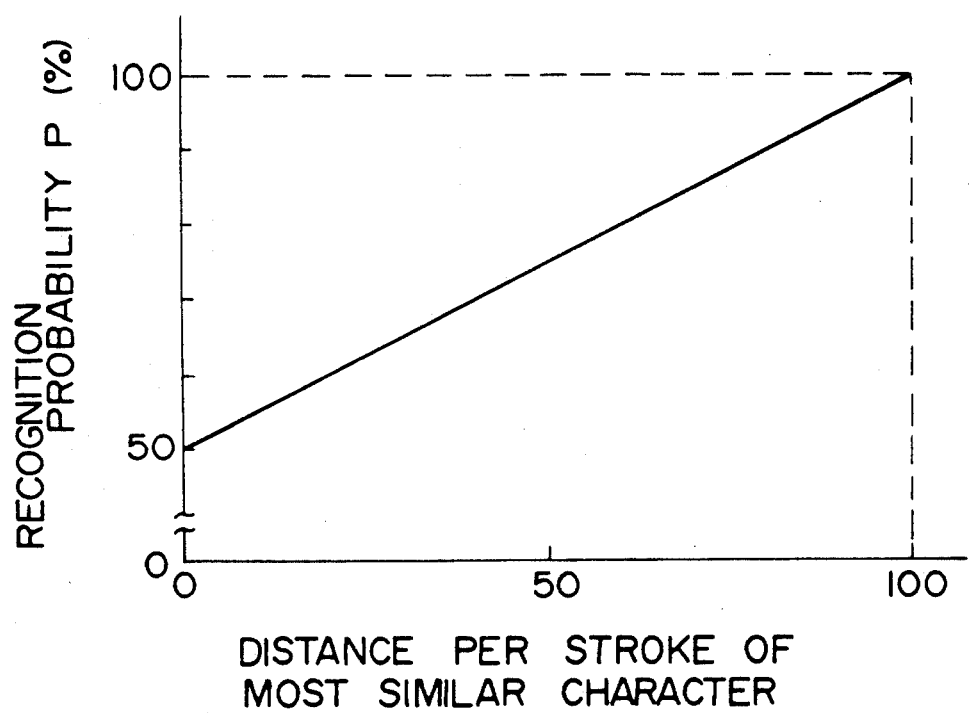

A stability index which indicates a degree of stability of recognition of the input character pattern is calculated by a probability calculation (step 5-403). In the step 5-403, as shown in FIG. 23, if a quotient of a division of a distance of a first candidate of the stored similar characters by the number of strokes N of the input pattern is zero, the probability is 50%, and if the quotient is larger than 100, the probability is 100%. In this method, the distance per stroke is calculated based on the registered dictionary pattern of the first candidate and the input pattern, and the probability of the character pattern to be registered is estimated based on the distance.

The similar character and its probability are displayed as shown in FIGS. 27a and 27b. Alternatively, the following probability descriptions may be displayed.
1) Uncertain (50-60%)
2) Little uncertain (60-70%)
3) Fair (70-80%)
4) Almost certain (80-90%)
5) Certain (more than 90%)

Figure 10:
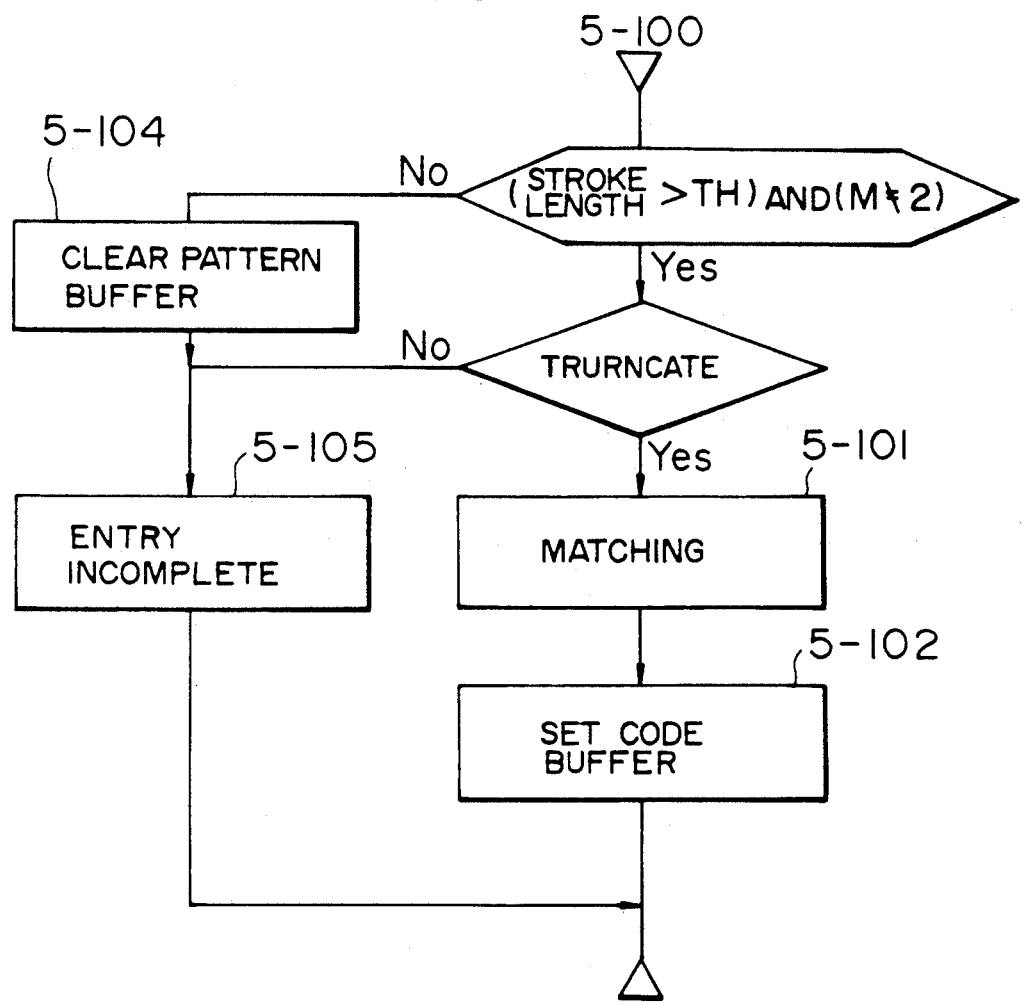
Figure 11:
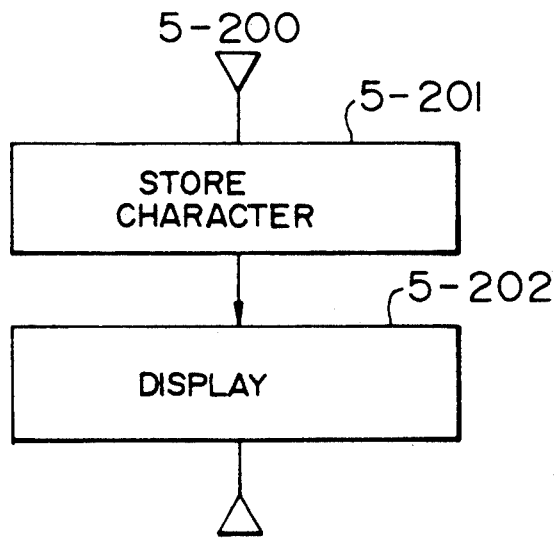

If the operator wants to cancel the input pattern based on the displayed information, he/she may touch a character input frame shown in FIG. 27 by a pen. In the recognition step 5-100 of FIG. 9, the pattern buffer is cleared in the step 5-104 at the first decision of FIG. 10. In the step 5-104, the content of the pattern buffer B3 corresponding to the input frame is erased.

If the operator accepts a similar character and its probability, he/she selects "register" as shown in FIG. 27b so that the input pattern is registered in a personal dictionary structured as shown in FIG. 20. As "register" is selected, the menu processing unit 6 registers the character (step 6-500). The step 6-500 corresponds to a case where the content of the mode register M of FIG. 8 is "2". The pattern is set (step 6-503) and the registration flag is reset (step 6-504). In the pattern setting step 6-503, the beginning of the registered pattern having N strokes at the beginning of the personal dictionary B3 is read in accordance with the number of strokes N corresponding to each frame of the pattern buffer B3, pattern data and font flag are inserted for each frame of the pattern buffer B3, and the number of registered characters NC is incremented by one. The font flag is set to "0" if the character code to be registered is a standard font code, and is set to "1" if it matches to the personal font code. The font flag indicates whether the display unit 8 should use the registered standard font or the personal font when the character is to be displayed.

In accordance with the present embodiment, the person dictionary and personal font may be prepared by hand writing. Thus, the operation is uniform and high man-machine operability is provided.

We claim:

1. A hand-written character recognition apparatus with a personal dictionary preparation function in which personal character patterns and character codes for characters are registered in pairs, comprising:
    input means for time-serially inputting hand-written character data;
    character recognition means for comparing the input hand-written character data from said input means with a standard dictionary of character data to recognize a most similar character pattern;
    display means for displaying a display font corresponding to the recognized character pattern; and
    personal dictionary storage means for registering personal character data and character codes for personal characters in pairs, said character recognition means including means for comparing inputted hand-written person character data of a character to be registered with said standard dictionary to recognize a similar character pattern, and means for selecting a code of the recognized character pattern as a character code of the personal character to be registered and for storing the personal character data and selected character code as a pair in said personal dictionary storage means.

2. A hand-written character recognition apparatus with a personal dictionary preparation function in which personal character patterns and character codes for characters are registered in pairs, comprising:
    input means for time-serially inputting handwritten character data;
    character recognition means for comparing the inputted hand-written character data from said input means with a standard dictionary of character data to recognize at least one similar character pattern;
    display means for displaying a display font corresponding to one or more recognized character patterns;
    personal dictionary storage means for registering personal character data and character codes for personal characters in pairs; and
    means for responsive to selection of one of the displayed characters for storing in said personal dictionary storage means a character code of the selected character as a character code of the personal character to be registered and the personal character data as a pair.

3. A hand-written character recognition apparatus with a personal dictionary preparation function in which personal character patterns and character codes for characters are registered in pairs, comprising:
    input means for time-serially inputting handwritten character data;
    character recognition means for comparing the input hand-written character data from said input means with a standard dictionary to recognize at least one similar character pattern;
    display means for displaying a display font corresponding to one or more recognized character patterns;
    key entry means for key-inputting a command for reading of a character to be registered;
    KANA to KNANJI conversion means for converting a KANA character to a corresponding KANJI character;
    personal dictionary storage means for registering personal character data and character codes for personal characters in pairs, said KANA to KANJI conversion means including means for sending to said display means a plurality of KANJI characters corresponding to an inputted character; and
    means responsive to selection of one of the displayed KANJI characters for storing in said personal dictionary storage means a character code of the selected character as a character code of the personal character to be registered and the personal character data as a pair.

4. A hand-written character recognition apparatus with a personal dictionary preparation function in which personal character patterns and character codes for characters are registered in pairs, comprising:
    input means for time-serially inputting handwritten character data;
    character recognition means for comparing the input hand-written character data from said input means with a standard dictionary to recognize a most similar character pattern;
    display means for displaying a display font corresponding to the recognized character pattern; and
    control means, responsive to inputting of a character to be registered by hand-writing, for operating said character recognition means to compare the input hand-written data with the standard dictionary, to select a code of a most similar character pattern of the standard dictionary as a character code of the character to be registered, and to register said character code and the personal character pattern inputted by hand-writing as a pair in a RAM card to form a personal dictionary.

5. A hand-written character recognition apparatus with a personal dictionary preparation function, comprising:
    input means for time serially inputting hand-written character data;
    character recognition means for comparing the input hand-written character data from said input means with a standard dictionary to recognize a most similar character pattern;
    personal dictionary registering personal character patterns and character codes of these characters in pairs;
    display means for selecting and displaying a display font corresponding to the recognized character pattern;
    means responsive to a character to be registered being inputted by hand-writing for causing said character recognition means to compare inputted hand-written character data of a personal character pattern to be registered with said standard dictionary to recognize a similar character pattern, and for selecting a code of the recognized character pattern as a character code of the character to be registered and means for registering said personal character pattern in said personal dictionary corresponding to said selected code.

6. A hand-written character recognition apparatus with a personal dictionary preparation function, comprising:
    input means for time serially inputting hand-written character data;

character recognition means for comparing the input hand-written character data from said input means with a standard dictionary to recognize a most similar character pattern;

personal dictionary registering personal character patterns and character codes of these characters in pairs;

display means for selecting and displaying a display font corresponding to the recognized character pattern; and means responsive to a character to be registered being inputted by hand-writing for causing said character recognition means to compare the inputted hand-written character data of the character to be registered with said standard dictionary to recognize a similar character pattern, and for selecting a code of the recognized character pattern as a character code of a personal character pattern to be registered, and means for registering said personal character pattern in said personal dictionary corresponding to the selected code, so that when a hand-written character is inputted by said input means, said recognition means operates to compare the input hand-written character with said personal dictionary to recognize a similar character pattern, and said display means displays a display of a font in said standard dictionary corresponding to the recognized character pattern in said personal dictionary.

* * * * *